(12) United States Patent
Nishigaki et al.

(10) Patent No.: US 6,683,969 B1
(45) Date of Patent: Jan. 27, 2004

(54) OBJECT DETECTION SYSTEM

(75) Inventors: Morimichi Nishigaki, Wako (JP); Masakazu Saka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,447

(22) Filed: May 10, 2000

(30) Foreign Application Priority Data

May 27, 1999 (JP) ............................................. 11-148303

(51) Int. Cl.[7] ................................................. G06K 9/00
(52) U.S. Cl. ....................... 382/104; 340/903; 180/167; 701/300; 382/103
(58) Field of Search ................................. 382/103, 104, 382/209, 106, 107; 340/937, 901, 903, 904, 933, 938, 425.5, 435, 436, 438; 701/93, 300, 301; 180/167, 169; 348/161; 367/909

(56) References Cited

U.S. PATENT DOCUMENTS

| | | | | |
|---|---|---|---|---|
| 4,622,636 A | * | 11/1986 | Tachibana | 701/96 |
| 5,243,663 A | * | 9/1993 | Kudoh | 382/104 |
| 6,075,874 A | * | 6/2000 | Higashikubo et al. | 382/104 |
| 6,088,468 A | * | 7/2000 | Ito et al. | 382/103 |
| 6,201,236 B1 | * | 3/2001 | Juds | 250/221 |
| RE37,610 E | * | 3/2002 | Tsuchiya et al. | 340/435 |

FOREIGN PATENT DOCUMENTS

| | | |
|---|---|---|
| JP | 06-150196 | 5/1994 |
| JP | 09-079821 | 3/1997 |

* cited by examiner

Primary Examiner—Jon Chang
Assistant Examiner—Charles Kim
(74) Attorney, Agent, or Firm—Lahive & Cockfield, LLP

(57) ABSTRACT

An object detection system comprises a physical object recognition unit which recognizes physical objects outside the vehicle, and a physical object memory which stores information concerning the physical objects. A controller recognizes presence of a physical object when the physical object is sensed by one or more sensors a predetermined number of times, which is larger for a central portion of the detecting area than for a peripheral portion of the detecting area. The system includes a memory for storing information about the physical objects. The controller holds the physical object stored in the memory indicating that the physical object is existent until the controller fails to recognize presence of the corresponding physical object a predetermined number of recognition cycles.

11 Claims, 8 Drawing Sheets

(a)

(b)

(c)

Road Area (a)

| Block | Object | Distance(m) | Relative Speed | No of Interpolation | Remaining Number |
|---|---|---|---|---|---|
| S 1 | | | | | |
| S 2 | | | | | |
| S 3 | | | | | |
| ⋮ | | | | | |
| S 8 | 1 | 1 5 | + 3 | 3 | 2 |
| ⋮ | | | | | |

OBJECT DETECTION SYSTEM

TECHNICAL FIELD OF THE INVENTION

The present invention concerns an optical object detection system which detects physical objects located outside an operating vehicle.

BACKGROUND OF THE INVENTION

Devices for detecting vehicles or other physical objects located ahead of or to the rear of an operating vehicle using laser radar have been proposed in the past. For example, in Japanese Patent Application Kokai No. Hei 06-150196, a method is described. Moving physical objects located ahead of the vehicle mounting the detection system are detected by laser radar. Information concerning the detected moving physical objects is stored in a memory, and control such as a tracking operation, etc., is performed. Specifically, if a moving physical object stored in the memory is not detected in the current detection process, the information concerning the moving physical object is retained in the memory as a detection error due to some cause until non-detection occurs a predetermined number of times. Then, when such a failure has occurred a predetermined number of times, the information concerning this moving physical object is deleted from the memory.

However, in such a method, if the number of times that a physical object that is not detected is retained without being deleted from the memory (i.e., the number of times of interpolation) is increased, the following problem arises. Namely, although such an increase makes it possible to continue the recognition of external physical objects in a more continuous manner, the interpolation treatment creates erroneous recognition which makes it appear as though an external physical object is present in the detection area of the system even when the external physical object has moved out of the detection area. Conversely, if the number of times of interpolation is decreased, the recognition of physical objects becomes intermittent as a result of detection error by the system.

SUMMARY OF THE INVENTION

In accordance with one aspect of the invention, an object detection system of the invention is mounted on a vehicle and comprises a physical object recognition unit which recognizes physical objects outside the vehicle, and a physical object memory which stores information concerning the physical objects. A controller recognizes presence of a physical object when the physical object is sensed by one or more sensors a predetermined number of times, which is larger for a central portion of the detecting area than for a peripheral portion of the detecting area.

The frequency of erroneous recognition due to erroneous detection is reduced compared to cases in which the recognition of physical objects is accomplished a fixed number of times regardless of the detection area. Physical objects that have entered the boundary portions of the detection area can quickly be recognized. When detecting a physical object located ahead of the vehicle inside the detection area, it is impossible for the physical object to suddenly appear in the center of the area. Conversely, at the edges of the detection area, a physical object may sometimes suddenly appear inside the detection area as seen by the sensors, as a result of a moving physical object entering the inside of the detection area from outside of the detection area. In view of such realistic conditions, the number of times of detection required for recognition is set at a large value in the center of the detection area in order to prevent erroneous recognition. On the other hand, at the edges of the detection area, since physical objects may suddenly appear as a result of the movement of moving physical objects or the behavior of the vehicle mounting the system, the number of times of detection required for physical object recognition is set at a small value.

According to another aspect of the invention, an object detection system of the invention comprises at least one sensor for sensing a physical object in a predetermined detecting area, a controller for recognizing presence of a physical object based on output from said sensor, and a memory for storing information about the physical object recognized by the controller. The controller holds the physical object stored in the memory indicating that the physical object is present until the controller fails to recognize presence of the corresponding physical object a predetermined number of recognition cycles.

The predetermined number of times is larger for the central portion of the detection area where the presence of physical objects such as other vehicles outside the vehicle mounting the system (typically ahead of or behind the vehicle) during the operation of the vehicle is ordinarily stable than the predetermined number of times for the peripheral portions of the detection area where there is a possibility of frequent entry and exit of moving physical objects. Accordingly, the dropout of physical objects in the central portion of the detection area can be prevented, and the erroneous recognition of physical objects that are not present in the peripheral portions of the detection area can be reduced.

BRIEF DESCRIPTION OF THE DRAWINGS

FIG. 8 is a diagram showing one example of the table stored in the physical object memory 16.

DESCRIPTION OF PREFERRED EMBODIMENT

Figure 1:
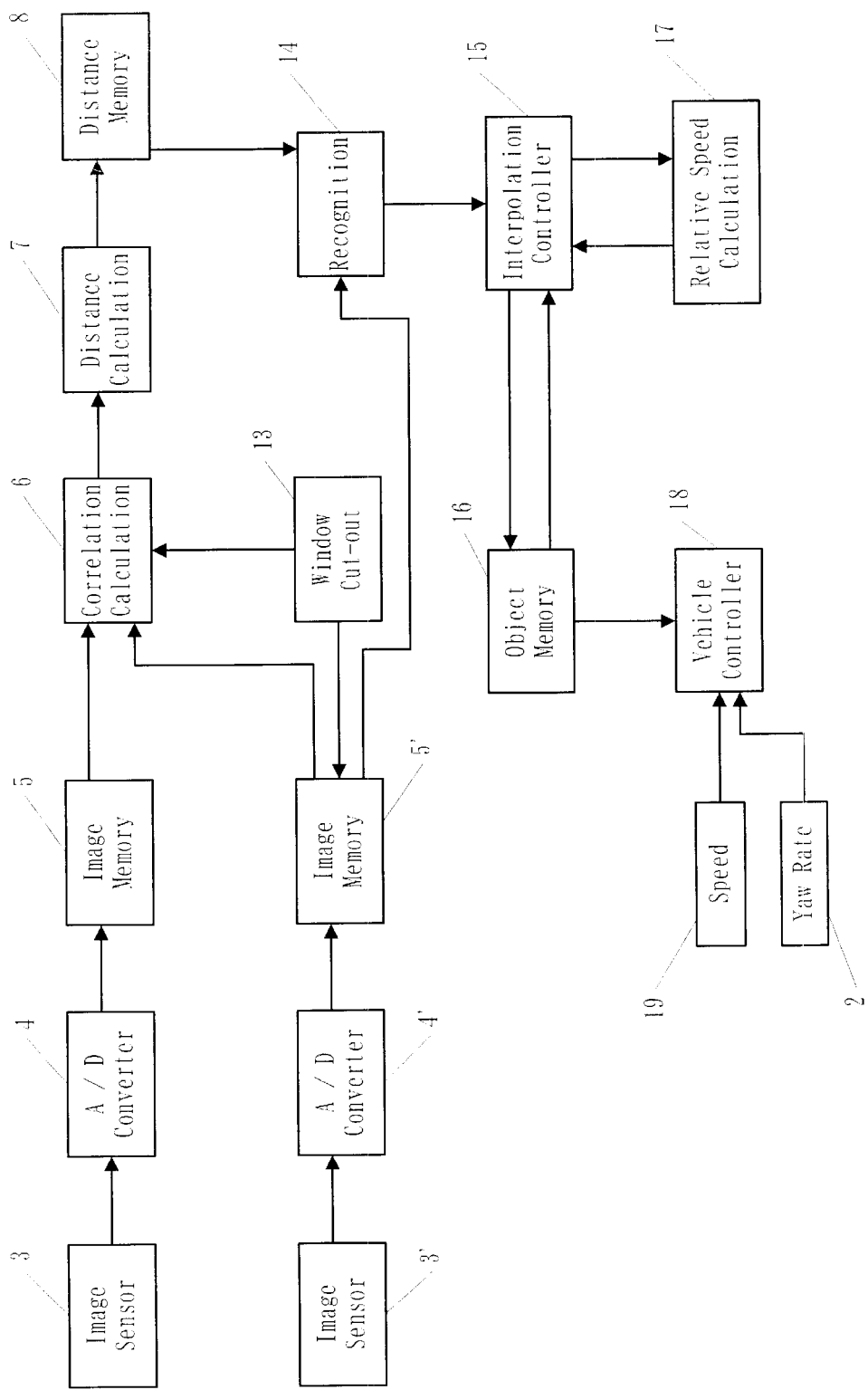
FIG. 1 is a block diagram illustrating the overall construction of one embodiment of the present invention
Figure 2:
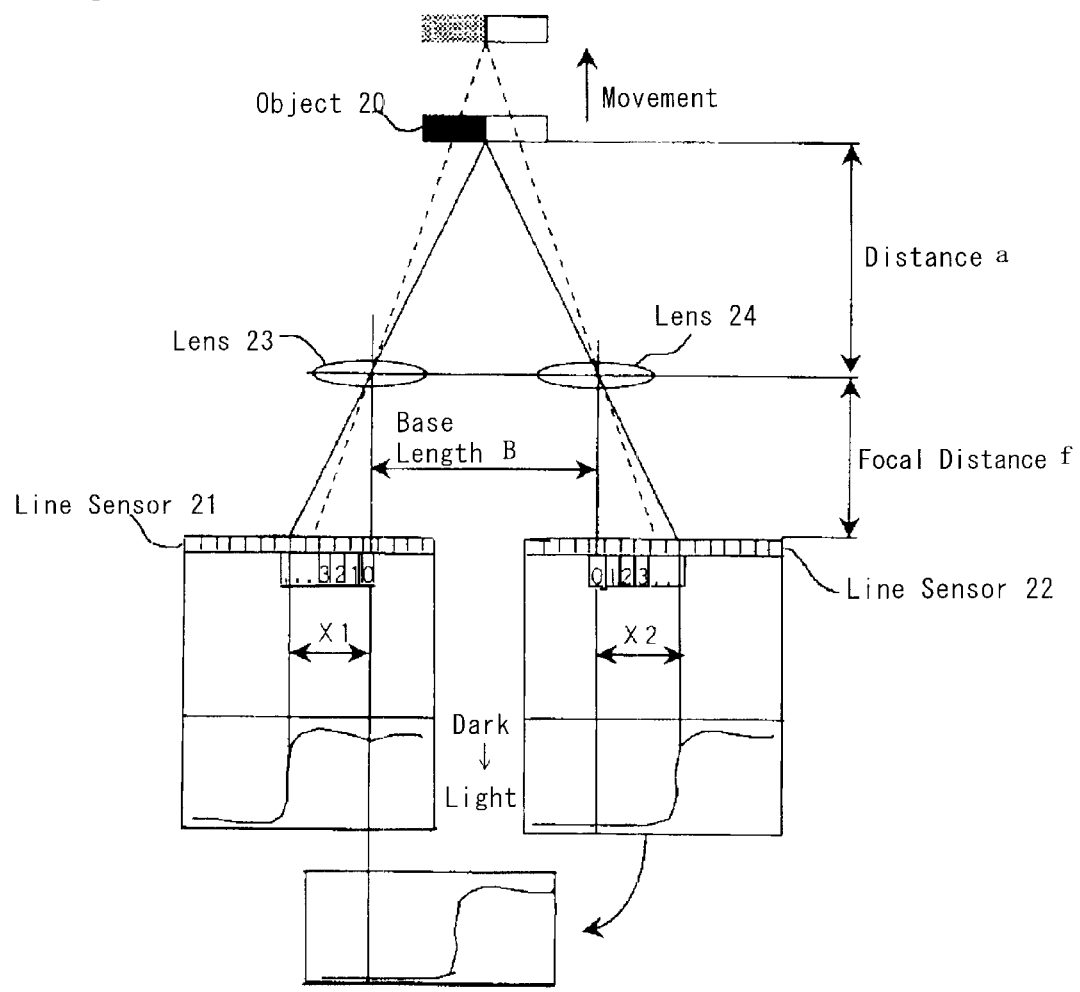
FIG. 2 is a diagram illustrating the triangulation method of measuring distances.

The invention will now be described relative to preferred embodiments referring to attached figures. FIG. 1 is an overall block diagram of an object detection system in accordance with one embodiment of the present invention. Other than the sensors 3 and 3', all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller. FIG. 2 is a diagram indicating the distance measurement principle based on the triangulation method used in the present embodiment. First, a distance measurement method using a pair of imaging devices will be described with reference to FIG. 2.

FIG. 2 is a diagram which indicates the distance measurement principle based on the triangulation method used in the present embodiment. First, a distance measurement method using a pair of image sensors will be described with reference to FIG. 2. A line sensor 21 and lens 23 constituting one of the abovementioned pair of image sensors are installed at a predetermined distance, i.e., at a distance equal to the base line length B in the horizontal or vertical direction from the line sensor 22 and lens 24 constituting the other image sensor of the other of the pair. The line sensors 21 and 22 are typically one-dimensional CCDs, but may also be linearly arranged photo-sensor arrays. Considering use at night, image sensors using infrared light are advisable. In this case, it is advisable to install infrared-transparent filters in front of the lenses 23 and 24, and to build the system such that an object 20 is illuminated at predetermined time intervals using an infrared light source. Infrared light reflected from the object 20 is sensed by the line sensors 21 and 22.

The line sensors 21 and 22 are respectively positioned at the focal lengths "f" of the lenses 23 and 24. Assuming that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22, then, according to the principle of triangulation, the distance a to the object 20 from the plane of the lenses 23 and 24 is determined by the equation: $a = B \cdot f/(X1+X2)$.

In the present embodiment, the images are digitized. And accordingly, the distance (X1+X2) is digitally calculated. The sum of the absolute values of the differences between the digital values indicating the brightness of the corresponding pixels of both images obtained from the line sensors 21 and 22 is determined while one or both of said images are shifted, and this sum is taken as a correlation value. The amount of shift of the images when this correlation value is at a minimum indicates the positional deviation between the two images, i.e., (X1+X2). In idealized terms, the distance by which the two images obtained from the line sensors 21 and 22 must be moved in order to cause said images to overlap as shown in FIG. 2 is (X1+X2).

Here, for the sake of simplicity, the image sensors were described as one-dimensional line sensors 21 and 22. However, in one embodiment of the present invention, as will be described below, two-dimensional CCDs or two-dimensional photo-sensor arrays are used as image sensors. In this case, the same correlation calculations as those described above are performed by relatively shifting the two-dimensional images obtained from the two image sensors. The amount of shift at the point where the correlation value reaches a minimum corresponds to (X1+X2).

Figure 3:
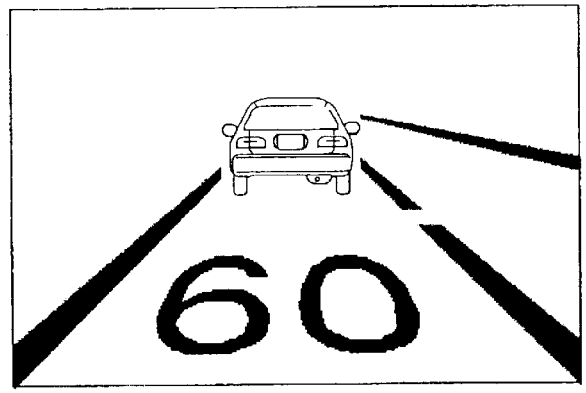
FIG. 3 is a schematic diagram illustrating the detection of physical objects based on images obtained from an image sensor.
Figure 3:
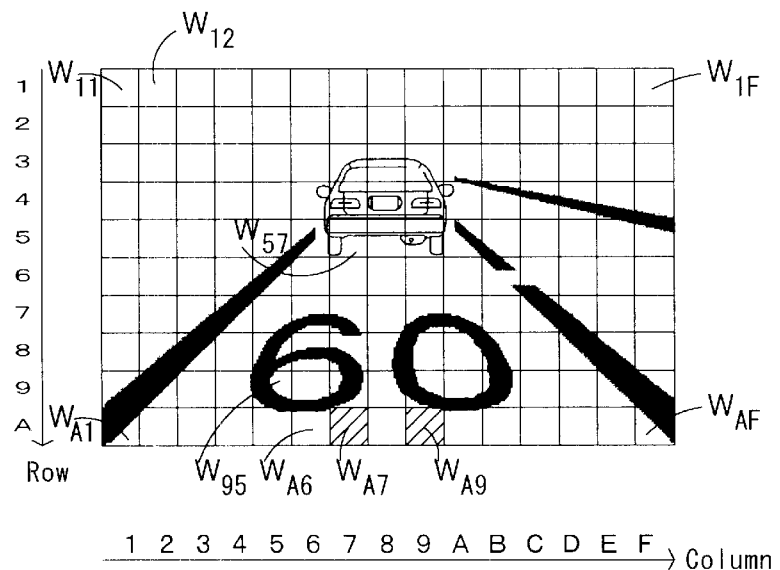
Figure 3:
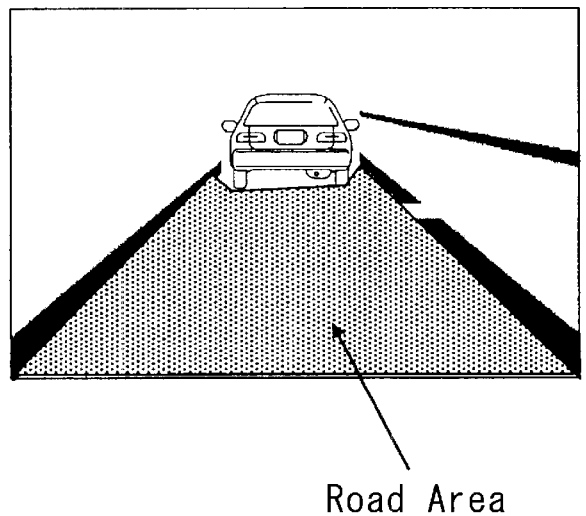

The image sensor 3 shown in FIG. 1 corresponds to one of the image sensor in FIG. 2, consisting of the lens 23 and line sensor 21, and the image sensor 3' corresponds to the other image sensor in FIG. 2, consisting of the lens 24 and line sensor 22. In this embodiment, as is shown in FIG. 3(b), the imaged area is divided into a plurality of windows (small sections) $W_{11}$, $W_{12}$, . . . and distance is measured for each window. Accordingly, a two-dimensional image of the overall object is required. Accordingly, each of the image sensor 3 and 3' is comprised of a two-dimensional CCD array or a two-dimensional photo-sensor array.

FIG. 3(a) shows an example of the image obtained when another vehicle running in front of the vehicle incorporating the system of the present invention is imaged by one of the image sensor 3 or 3'. FIG. 3(b) shows the image in FIG. 3(a) schematically split into a plurality of small sections called windows. FIG. 3(b) has rows in the vertical direction and columns in horizontal direction. For the sake of simplicity, the image is shown splitting into 10 rows×15 columns of windows. Reference numerals are assigned to the respective windows. For example $W_{12}$ indicates the window in row 1, column 2.

Referring to FIG. 1, the images of objects captured by the image sensor 3 and 3' are converted into digital data by analog-digital converters (A/D converters) 4 and 4' and stored in image memories 5 and 5'. The image portions corresponding to the window $W_{11}$ are respectively cut out from the image memories 5 and 5' by a window cutout part 9 and sent to a correlation calculating part 6. The correlation calculating part shifts the two cutout images by a predetermined unit at a time, and performs the aforementioned correlation calculations. The amount of shift at the point where the correlation value reaches a minimum corresponds to (X1+X2). The correlation calculating part 6 sends the value of (X1+X2) thus determined to a distance calculating part 7.

The distance calculating part 7 determines the distance $a_{11}$ to the object in the window $W_{11}$ using the aforementioned formula: $a = B \cdot f/(X1+X2)$. The distance a thus determined is stored in a distance memory 8. A similar calculation process is successively performed for respective windows, and the resulting distances $a_{11}$, $a_{12}$, . . . are stored in the distance memory 8. The distance to a captured object calculated for each window is referred to as the measured distance of the window.

In the image data used in the abovementioned correlation calculations, the pitch of the elements in the imaging element array determines the resolution. Accordingly, when a light-receiving element such as a photo-sensor array that has a relatively large pitch is used, it is preferred to enhance the density of the image data by performing calculations involving inter-pitch interpolation. Correlation calculations can be performed for image data whose density has thus been enhanced.

In order to correct for variations in the characteristics of the imaging element array according to temperature, a temperature sensor may be installed in the vicinity of the imaging element array, and the distance calculations are corrected based on temperature information obtained from the temperature sensor.

Figure 4:
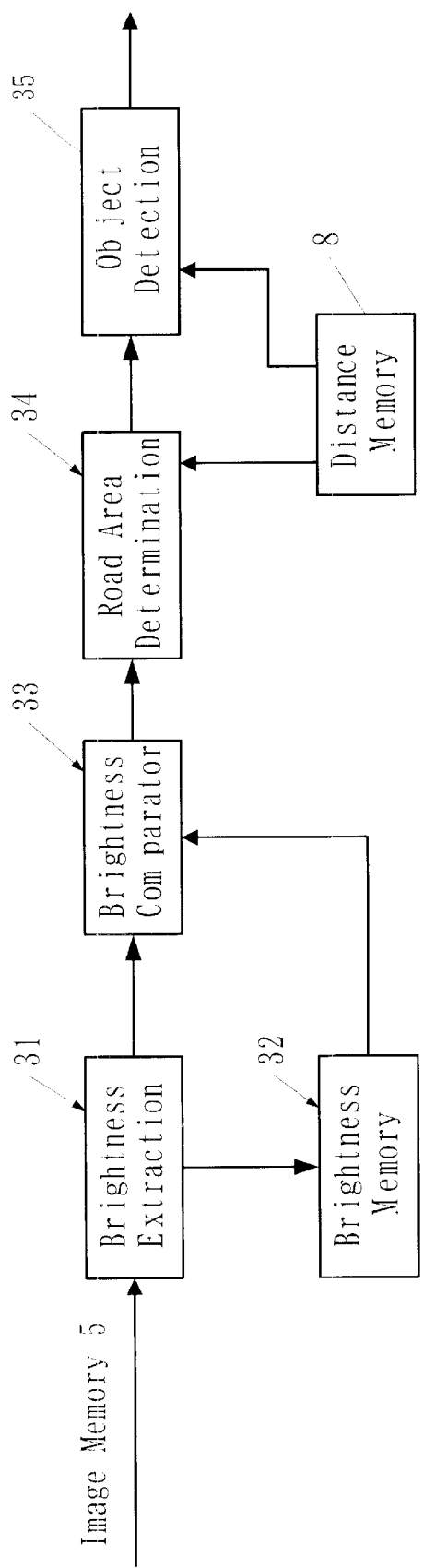
FIG. 4 is a block diagram showing details of the physical object recognition unit 14 shown in FIG. 1.

The physical object recognition unit 14 shown in FIG. 1 recognizes physical objects based on the distances of the respective windows stored in the distance memory 8 and image data supplied from the image memory 5'. FIG. 4 is a block diagram which illustrates the construction of the physical object recognition unit 14. The physical object recognition unit 14 in this embodiment uses a method in which road areas are judged from the image, and physical objects that are not road areas are judged to be physical objects.

Next, the judgment of road areas in the image will be described with reference to FIGS. 1 and 4. As was mentioned above, FIG. 3(b) is divided into 10 rows×15 columns for the convenience of description. In actuality, however, the image area is extremely finely divided. For high precision determination of the road area, each window may consist of a single pixel. Alternatively, a plurality of pixels may be combined to form a single window. The respective windows are preferably of the same size. Windows of different size may also be used.

When the image obtained from the image sensor 3' and converted into digital data is stored in the image memory 5', the window cut-out unit 13 shown in FIG. 1 cuts out a plurality of windows containing the image area located immediately in front of the vehicle. The brightness extraction unit 31 acquires a plurality of brightness values from the cut-out windows.

Brightness values of windows containing the image area located immediately in front of the vehicle are acquired because there is an extremely high probability that the image area located immediately in front of the vehicle is a road. Accordingly, a plurality of brightness values are acquired in order to allow the acquisition of the intrinsic road brightness values even if marked areas such as characters or white lines, etc., are present on the road surface. The question of which windows of the input image are acquired as the plurality of windows containing the image area located immediately in front of the vehicle mounting the system is determined beforehand in accordance with the size of the vehicle and the positions of the image sensors within the vehicle, etc.

Next, in order to extract the intrinsic brightness value of the road, the brightness values of the windows containing marked areas on the road surface are deleted. For example, in cases where several windows containing markings on the road surface are included in the bottom row of windows in the image, a slight variation occurs in the brightness values of the windows of this row, since the brightness of markings on the road surface generally differs greatly from the brightness of the road surface. Accordingly, the brightness values of the windows in this row can be averaged, and brightness values that differ from the average value by a predetermined value or greater can be deleted.

Alternatively, since markings on the road surface are mainly white or yellow and thus differ greatly from the color of the road itself, brightness values corresponding to white or yellow can be deleted. It is also possible to infer whether or not brightness values acquired from the currently input image are intrinsic brightness values of the road based on a reference value extracted from the previously input image.

After the brightness values of windows that contain markings on the road surface are deleted, the brightness extraction unit 31 extracts a reference brightness value based on the remaining brightness values, and stores this reference brightness value in the brightness memory 32. One or more brightness values can be selected from the remaining brightness values and stored as reference brightness values. Alternatively, a value obtained by averaging a plurality of brightness values can be stored as a single reference brightness value. For example, the brightness values can be expressed as digital data with 256 gradations (from pure black "0" to pure white "255").

Then, the window cut-out unit 13 (FIG. 1) cuts out other windows from the image, and the brightness extraction unit 31 extracts the brightness values of these windows. The brightness comparison unit 33 compares the extracted brightness values with the reference brightness value(s) stored in the brightness memory 32.

In cases where each window comprises a plurality of pixels, an average of the sum of the brightness values of the respective pixels can be taken, and this average value can be extracted as the brightness value of the window. The process that extracts and compares the brightness values can be performed in parallel with the process that calculates the distances described above.

The road area judgment unit 34 judges road areas based on the comparative results received from the brightness comparison unit 33. If the results of the comparison are within a predetermined range, the window is judged to be a road area. This is because road area has similar brightness throughout the area, which differs from the brightness of a vehicle or other objects running ahead of the vehicle mounting the system. One or more brightness values of windows judged to be road areas are stored in the brightness memory as new brightness values.

Next, an example of the judgment of road areas based on brightness values will be described with reference to FIG. 3(b). The windows $W_{A7}$ and $W_{A9}$ (windows indicated by shading) that include the image area immediately in front of the vehicle are cut out by the window cut-out unit 13. Then, the brightness extraction unit 31 extracts the brightness values L1 and L2 of the respective windows, and stores these values in the brightness memory 32 as reference brightness values. Next, the window $W_{A6}$ that is adjacent to the window $W_{A7}$ is cut out, and the brightness extraction unit 31 extracts the brightness value of the window $W_{A6}$. The brightness comparison unit 33 compares the extracted brightness value with the reference brightness value L1. If the results of this comparison are within a predetermined range (e.g., a range of ±3 relative to the reference brightness value can be designated as this predetermined range), the road area judgment unit 34 judges that the window $W_{A6}$ is a road area, and the brightness value of the window $W_{A6}$ is stored in the brightness memory 32 as a new reference brightness value L3.

Then, the window $W_{A5}$ that is adjacent to the window $W_{A6}$ is cut out, and the brightness value of the window $W_{A5}$ is extracted by the brightness extraction unit 31. The brightness comparison unit 33 compares the extracted brightness value with the reference brightness value L3. If the results of this comparison are within a predetermined range, the road area judgment unit 34 judges that the window $W_{A5}$ is a road area, and the brightness value of the window $W_{A5}$ is stored in the brightness memory 32 as a new reference brightness value L4. Thus, windows are successively cut out from the image, and road areas are judged by comparing the brightness values for each window.

Preferably, the windows cut out by the window cut-out unit 13 are located in the vicinity of windows that have reference brightness values. More specifically, in a case where the reference brightness value is the brightness value of the window $W_{A6}$, preferably windows that belong to the same row as the window $W_{A6}$ or windows that belong to an adjacent row are cut out to compare the brightness values of these windows. This is because if the difference in the measured distances from the vehicle of the two windows to be compared is large, the brightness values of the windows may differ substantially even if both windows contain the same road surface. In the present embodiment, road areas can be accurately detected even in cases where the brightness of the road surface within the image varies according to the distance from the vehicle mounting the system.

It would also be possible to use brightness values (L1 and L2 in the above example) initially extracted from windows containing road areas located immediately in front of the vehicle without as fixed reference brightness values without using brightness values judged to be road areas as new brightness values as in the above embodiment, and to judge road areas by comparing the brightness values of the respective windows of the image with these brightness values.

In the embodiment described above, brightness values were extracted based on a single image obtained from a single image sensor 3'. However, it would also be possible to perform this extraction using two or more images obtained by the two or more image sensors required for the distance measurements mentioned above. For example, it would be possible to extract the reference brightness value L2 from the image captured by the image sensor 3, and to extract the reference brightness value L1 from the image captured by the image sensor 3'.

Preferably, the process for judging road areas by comparing brightness values is carried out in parallel with one or more other processes. For example, the windows can be processed in row units, e.g., the brightness values of the windows $W_{A1}$ through $W_{A6}$ and $W_{91}$ through $W_{97}$ may be compared with the reference brightness value L1 at one time, and the brightness values of the windows $W_{81}$, through $W_{87}$ may then be compared with a new reference brightness value of the window $W_{93}$ at one time if it become the new reference brightness value in the preceding comparison. In order to achieve high-speed processing, preferably the windows in the left half of the image are processed using the reference brightness value L1 as a base point, and the windows in the right half of the image are processed using the reference brightness value L2 as a base point, with both sets of windows being processed in parallel.

Furthermore, areas surrounded by image areas that have been judged to belong to the road area can be automatically judged to belong to the road area. In this way, areas surrounded by the areas that have been judged to belong to the road area can be judged to belong to the road area even if the surrounded areas are marked areas that have a different brightness from the road. The size of such areas surrounded by road areas that can be judged to belong to the road area is determined based on the size of the physical objects that are to be detected.

Thus, since the road surface itself is detected based on brightness values, road areas can be judged even if the vehicle mounting the system is inclined as a result of pitching or rolling, or is running on a slope or bank, and it can be judged that no other vehicles or physical objects are present in the road areas thus judged.

Here, marked areas on the road surface can be accurately extracted using the measured distances of the windows. The road area judgment unit 34 fetches from the distance memory 8 the measured distances of windows for which the results of the comparison described above are not within the predetermined range, and judges whether or not these distances are distances to the road. Then, if these distances are distances to the road, these windows are judged to belong to marked areas on the road surface.

The distances of windows to the road can be inferred from the measured distances (i.e., measured distances to the road) of other windows judged to belong to the road area. For example, it can be inferred that the distance to the road is the same for all windows contained in the row to which such other windows belong. The distance to the road can be inferred for each row of windows from the measured distances of windows judged to belong to the road area. Accordingly, the road area judgment unit 34 can judge whether or not the image areas of windows are marked areas on the road surface by comparing the distances actually measured for the windows with the inferred distance to the road.

For example, as is shown in FIG. 3(b), the window $W_{95}$ contains a character marked on the road surface. The road area judgment unit 34 receives the comparative results for the window $W_{95}$. Since the comparative results are not within the predetermined range, the road area judgment unit 34 fetches the measured distance of the window $W_{95}$ from the distance memory 8. The road area judgment unit 34 also fetches from the distance memory 8 the measured distance of another window $W_{93}$, which belongs to the same row as the window $W_{95}$, and which has been judged to belong to the road area. Since the results of a comparison of the two distances show that the distances are substantially the same, the image area of the window $W_{95}$ is judged to be a marked area on the road surface. The marking "60" on the road surface shown in FIG. 3(b) can be recognized by repeating such judgments.

Since marked areas on the road surface can be extracted and recognized using measured distances as described above, the vehicle can also be controlled to warn (for example) the driver about speeding and lane changes, etc.

The judgment of road areas described so far can be performed for all areas of the image input from the image sensor, or can be performed for only some of these areas. For example, the judgment processing can be performed only for image areas input as new images (as the vehicle mounting the system travels) with respect to previously input images. Furthermore, road areas can also be judged using the preset road model of a car navigation system. Thus, by limiting the image areas for which judgments are made, the judgment of road areas can be accomplished efficiently.

As the road area is determined, the windows within the image can be classified into the windows representing the road area and the windows representing other things. If necessary, the road area judgment unit 34 can output the road area constructed from windows judged to belong to the road area in the form of an image. FIG. 3(c) shows an example of such an output image. The detected road area is indicated by shading.

The physical object detection unit 35 detects physical objects on the road surface based on the road areas judged by the road area judgment unit 34. As the road area is determined, physical objects can be detected by extracting windows that are located ahead of the road areas, and that have not been judged to belong to the road area.

For example, as the overall road area is determined as shown in FIG. 3(c), the windows $W_{57}$, $W_{58}$ and $W_{59}$ are extracted by following the road area ahead and identifying the windows that have not been determined to belong to the road area. As is shown in FIG. 3(b), such windows contain another vehicle that is running ahead. The physical object detection unit 35 fetches the measured distances of these windows from the distance memory 8. The distance from the vehicle mounting the system to the other vehicle can be detected from the measured distances thus acquired. From the positions of the windows $W_{57}$, $W_{58}$ and $W_{59}$ (which represent physical object areas) relative to the windows $W_{66}$ through $W_{6A}$ that have been determined to be the road area, location of the other vehicle in the lane may be determined.

Thus, since the physical object detection unit 35 can detect the inter-vehicle distances to other vehicles running ahead based on distances to detected physical objects, the driver can be warned regarding such inter-vehicle distances. In cases where physical objects that would interfere with the operation of the vehicle are located on the road surface ahead, the driver can be warned by the sounding of an alarm.

Figure 5:
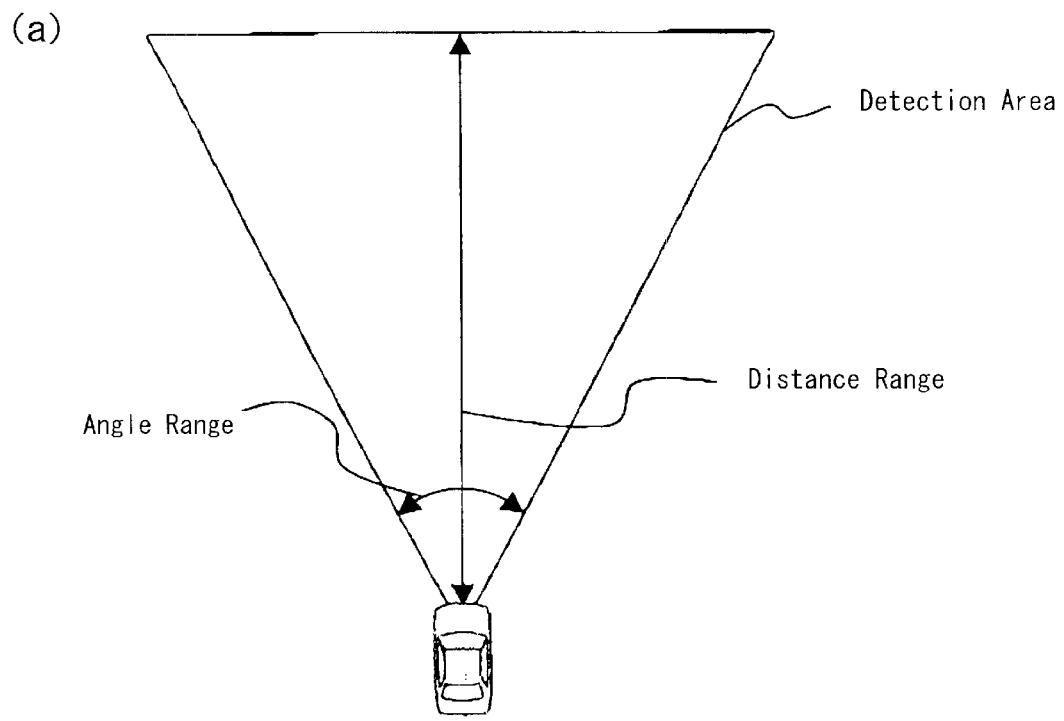
FIG. 5 is a diagram illustrating the detection area and the division of the detection area.
Figure 5:
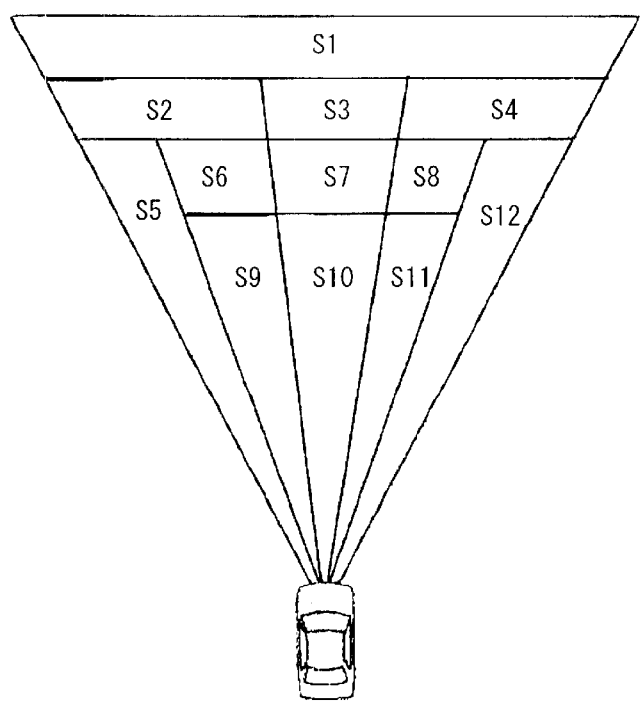

Returning to FIG. 1, the system can be built such that the physical object recognition unit 14 recognizes physical objects responsive to detection of physical objects a predetermined number of times in respective sections of the detection area as shown in FIG. 5. FIG. 5(a) shows the detection area for physical object detection by the object detection system in one embodiment of the present invention. The detection area may be set as a fixed range, e.g., with the distance range set at 60 meters and the angular range set at 30 degrees. The range may preferably be set dynamically in accordance with the vehicle speed. In such a case, the system is programmed so that the distance range increases and the angular range decreases as the vehicle speed increases.

FIG. 5(b) shows one example of partitioning of a fixed detection area. In this example, the detection area is divided into blocks S1 through S12. In cases where the detection area is set to vary dynamically, the blocks S1 through S12 vary in proportion to the variation of the detection area. When the angular range becomes smaller than approximately 20 degrees as the speed of the vehicle mounting the system increases, partitioning in lateral direction becomes too fine relative to angular range. Accordingly, the blocks S5 and S12 on both sides are omitted.

The number of times of detection for the blocks S1, S2 and S4 is set at 2, the number of times of detection for the blocks S3, S5, S6, S8 and S12 is set at 3, the number of times of detection for the blocks S7, S9 and S11 is set at 4, and the number of times of detection for the block S10 is set at 5. The number of times of detection for the blocks S1, S2, S3, S4, S5, S6, S8 and S12, which constitute the end portions of the area, are set at smaller values than the number of times of detection for the blocks S7, S9, S10 and S11, which constitute the central portions of the area. This is based on the empirical rule that the variation of moving physical objects (vehicles) detected in these peripheral blocks is large, while the variation of moving physical objects detected in the central blocks is small. In other words, in the peripheral areas where there is a high level of variation in terms of the entry and exit of vehicles, the number of times of detection is set at a small value so that the variation of vehicles is quickly reflected in the vehicle detection state. In the central area where there is little variation in terms of the entry and exit of vehicle, the number of times of detection is set at a large value so that a stable vehicle detection state can be obtained.

In one aspect of the present invention, in place of varying the number of times of detection, the interpolation controller 15 performs the interpolation of physical object information when information concerning detected physical objects is stored in the physical object memory 16.

In this embodiment, the number of times of interpolation for the blocks S1, S2 and S4 is set at 2, the number of times of interpolation for the blocks S3, S5, S6, S8 and S12 is set at 3, the number of times of interpolation for the blocks S7, S9 and S11 is set at 4, and the number of times interpolation for the block S10 is set at 5. The number of times of interpolation for the blocks S1, S2, S3, S4, S5, S6, S8 and S12, which constitute the peripheral portions of the area, are set at a smaller value than the number of times of interpolation for the blocks S7, S9, S10 and S11, which constitute the central portions of the area. This is based on the above-mentioned empirical rule. In the peripheral areas where there is a high level of variation in terms of the entry and exit of vehicles, the number of times of interpolation is set at a small value so that the variation of vehicles is quickly reflected in the vehicle detection state. In the central area where there is little variation in terms of the entry and exit of vehicle, the number of times of interpolation is set at a large value so that a stable vehicle detection state can be obtained.

Figure 6:
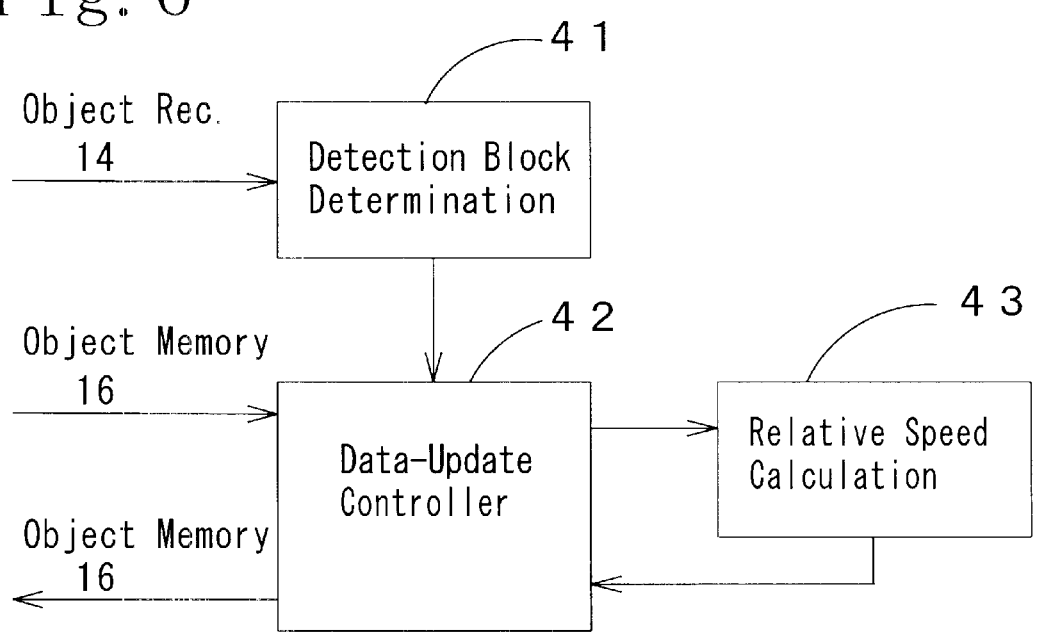
FIG. 6 is a block diagram showing details of the interpolation controller 15 shown in FIG. 1.

The physical object detection operation is performed (for example) with a cycle of 100 milliseconds, so that the content of the physical object memory 16 is updated via the interpolation controller 15 every 100 milliseconds. FIG. 6 is a block diagram of the interpolation controller 15. When the detection system obtains an image such as that shown in FIG. 3(a), the physical object recognition unit 14 recognizes the presence of physical objects in the windows W37, W38, W39, W47, W48, W49, W57, W58 and W59 by the method described with reference to FIG. 4. The physical object recognition unit 4 recognizes that the distances to the physical objects of these windows are the same. Based on this recognition, the physical object recognition unit 14 judges that the physical objects present in these windows constitute a single integral physical object, and sends it to the detection block judgment unit 41 of the interpolation controller as a first physical object together with associated window information and distance information. When second and third physical objects are detected from the image, similar information is sent to the detection block judgment unit 41 for these physical objects.

Figure 7:
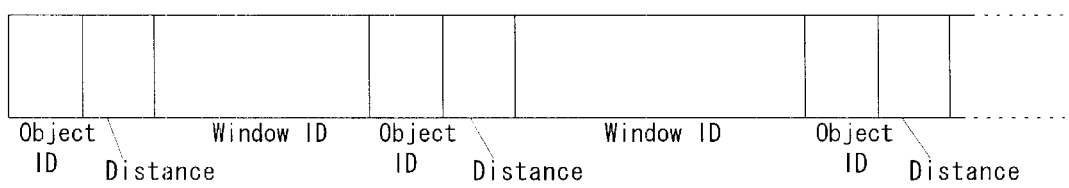
FIG. 7 is a diagram showing the format of the data transferred to the interpolation controller 15 from the physical object recognition unit 14.

An example of the format used for this purpose is shown in FIG. 7. The physical object ID field is used to enter a physical object ID which distinguishes among a plurality of physical objects. A code may be used in which the first physical object is identified as 001, the second physical object is identified as 010 and the third physical object is identified as 011. A value indicating the distance to the physical object in meter units is entered in the distance field of the format. A code identifying the plurality of windows in which the physical object in question is detected is entered in the window ID field.

The detection block judgment unit 41 (FIG. 6) compares the detection area with the window information and distance information sent from the physical object recognition unit 14 and determines that, for example, the first physical object is in block S8 of the detection area.

The physical object memory 16 (FIG. 1) comprises a table consisting of a random access memory, and accommodates information indicating the presence or absence of a physical object for respective blocks of the detection area, information indicating the relative speed between the vehicle mounting the system and the physical objects, information indicating the fixed number of times of interpolation for the respective blocks, and information indicating the remaining number of times that interpolation is to be performed. Typically, the format of this table is as shown in FIG. 8. In FIG. 8, the first physical object 1 (code 001) is in block S8, and the distance from the vehicle mounting the system to this physical object 1 is 15 meters. The relative speed between the vehicle mounting the system and the physical object 1 is +3 km/h, the number of times of interpolation for this block is 3, the remaining number of times of interpolation for the physical object 1 is 2. This indicates that the first interpolation has been performed as a result of no physical object being detected in this block in the preceding detection cycle in which the writing of the table took place.

The data-updating controller 42 shown in FIG. 6 receives information indicating the presence or absence of physical objects for each block from the detection block judgment unit 41. In response to this information, the data-updating controller 42 reads out information for the corresponding blocks from the table of the physical object memory 16 (FIG. 8). Depending on the information from the detection block judgment unit 41 and the information read out from the table, the data-updating controller 42 performs the following process for respective blocks:

1) In cases where information indicating absence of a physical object is received from the detection block judgment unit 41, and physical object information is not stored in the corresponding block of the table:

In such cases, the data-updating controller 42 proceeds to the processing for the next detection block.

2) In cases where information indicating absence of a physical object is received from the detection block judgment unit 41, and physical object information is stored in the corresponding block of the table:

For example, when information indicating absence of a physical object is received from the detection block judgment unit 42 for the block S8, and the record for the block S8 with the content shown in FIG. 8 is read out from the table, the data updating controller enters a value obtained by subtracting 1 from the value of the remaining-number-of-times field of the record in the remaining-number-of-times field, and overwrites the record of the block S8 on the table without updating the data of the other fields. As a result, the remaining-number-of-times field of the block S8 becomes 1.

When the value of the "remaining-number-of-times" field of the record of the block S8 is 0 at the beginning of the process, the data updating controller 42 resets the data other than the "number-of-times-of-interpolation" field of the record of the block S8 to a null state, or to all 0's or all 1's (these states are referred to collectively as a "null state"), and overwrites the record after reset into the table. As a result, in the record of block S8, the value of the "number-of-times-of-interpolation" field is 3, and the other fields are in a null state.

3) In cases where information indicating presence of a physical object is received from the from the detection block judgment unit 41, and there is no physical object information in the record of the corresponding block of the table:

The data-updating controller 42 enters physical object ID and distance data received from the detection block judgment unit 41 in the "physical object" field and "distance" field of the record of the corresponding block, and overwrites the table with the record that has thus been updated. As is clear from the preceding description, the "remaining-number-of-times" field functions as a down-counter.

4) In cases where information indicating presence of a physical object is received from the from the detection block judgment unit 41, and there is physical object information in the record of the corresponding block of the table:

The data-updating controller 42 sends distance information (current distance information) received from the detection block judgment unit and distance information (previous distance information) read out from the record of the corresponding block of the table to the relative speed-calculating unit 43. In response, the relative speed-calculating unit 43 calculates the relative speed between the physical object and the vehicle mounting the system using the calculation formula:

relative speed=(current distance−previous distance)/detection time interval.

The detection time interval is the time difference between the previous measurement and the current measurement. This time difference is 100 milliseconds in the present embodiment. The relative speed calculating unit 43 converts the value thus obtained into km/h and sends it to the data-updating controller 42.

The data-updating controller 42 replaces the "physical object" field and "distance" field of the record of the corresponding block received from the table with data received from the detection block judgment unit 41. The data-updating controller 42 enters the value received from the relative speed calculating unit 43 into the "relative speed" field, and decrements the value in the "remaining-number-of-times" field. The record of the corresponding block of the table is overwritten with the updated record thus obtained.

Thus, physical object information of the type shown in the table in FIG. 8 is stored in the physical object memory 16 shown in FIG. 1. The vehicle controller 18 performs control functions such as auto-cruising control with vehicle-tracking function, activating an alarm in case of too small inter-vehicle distance and automatic speed reduction control, etc., based on the information stored in the physical object memory 16 and information received from the vehicle speed detection system 19 and yaw rate detection system 2, etc.

The correlation calculating unit 6, distance measurement unit 7, distance memory 8, window cut-out unit 13, physical object recognition unit 14, interpolation controller 15, physical object memory 16, relative speed calculating unit 17 and vehicle controller 18 can be constructed using a central processing unit (CPU), a read-only memory which accommodates control programs and control data, and a random-access memory (RAM) which provides an operational working region for the CPU and which temporarily stores various types of data. The distance memory 8 and physical object recognition unit 16 can be realized using respectively different memory regions of a single RAM. Furthermore, temporary storage regions for data required in various types of operations can also be realized using portions of the same RAM.

Furthermore, the object detection system of the present invention can be LAN-connected with an engine electronic control unit (ECU), brake-control ECU or other ECU, and the output from this object detection system can be used for overall control of the vehicle.

Thus it has been shown that in the system of the invention the frequency of erroneous recognition due to erroneous detection is reduced compared to cases in which the recognition of physical objects is performed by a fixed number of times of detection regardless of the detection area. Furthermore, physical objects entering the boundary portions of the detection area can be quickly recognized.

The dropout of physical objects in the central portion of the detection area can be prevented, and erroneous processing indicating the presence of physical objects that are not actually present in the peripheral portions of the detection area can be reduced.

Although the invention has been shown and described with reference to specific embodiments, it is understood that any modifications and changes are allowed, provided they do not depart from the scope of the appended claims.

What is claimed is:

1. An object recognition system mounted on a vehicle, comprising:
   at least one sensor for sensing a physical object in a predetermined detecting area; and
   a controller for recognizing presence of a physical object when the physical object is sensed by said sensor a predetermined number of times, said predetermined number of times being larger for a central portion of the detecting area than for a peripheral portion of the detecting area.

2. The system of claim 1, wherein said at least one sensor comprises two image sensors for capturing image of the detecting area.

3. The system of claim 2, wherein said controller determines road area based on brightness values of respective windows of the captured image.

4. The system of claim 3, wherein said controller progressively compares brightness values of respective windows using a window corresponding to an area near the vehicle as a reference window, said reference window being progressively replaced by a window that is newly identified as belonging to the road area.

5. The system of claim 4, wherein said controller identifies a window whose brightness value differs from that of progressively replaced reference window by more than a predetermined value as belonging to a physical object or a mark on the road.

6. A method for recognizing an object from a moving vehicle, comprising the steps of:

capturing an image of a predetermined detecting area;

processing the image to distinguish a physical object from a road area; and recognizing presence of a physical object when the physical object is detected a predetermined number of times, said predetermined number of times being larger for a central portion of the detecting area than for a peripheral portion of the detecting area.

7. The method of claim 6, wherein the physical object is distinguished from the road area based on brightness values of respective windows of the captured image.

8. The method of claim 6, wherein the step of processing includes the step of progressively comparing brightness values of respective windows using a window corresponding to an area near the vehicle as a reference window, said reference window being progressively replaced by a window that is newly identified as belonging to the road area.

9. The method of claim 8, wherein the step of processing includes the step of identifying a window whose brightness value differs from that of the progressively replaced reference window by more than a predetermined value as belonging to a physical object or a mark on the road.

10. The system of claim 1, wherein said predetermined detecting area comprises a plurality of regions having a plurality of shapes.

11. The method of claim 6, wherein said predetermined detecting area comprises a plurality of regions having a plurality of shapes.

* * * * *